3,014,047
OXYGENATED MONOCYCLIC TERPENES AND PRODUCTION THEREOF

Joseph P. Bain, Wilbur Y. Gary, and Eugene A. Klein, Jacksonville, Fla., assignors to The Glidden Company, Cleveland, Ohio, a corporation of Ohio
No Drawing. Filed Aug. 27, 1953, Ser. No. 377,000
29 Claims. (Cl. 260—348)

The present invention relates to the production of oxygenated terpenes of the monocyclic series.

$d$-Limonene is the major constituent of by-product citrus terpenes. $l$-Limonene is readily available by isomerizing $l$-$\alpha$-pinene or $\beta$-pinene and also occurs in various natural oils. $\alpha$-Terpineol is the major constituent of pine oil, and, in addition, is readily synthesized by hydration of turpentine as is known. Further, carvomenthene is readily produced, as is known, by selective hydrogenation of limonene, the optical rotation of the carvomenthene and its optical purity depending upon the optical rotation of the starting limonene. Also it is known that the pinenes on treatment with acetic acid yield terpinyl acetate, or upon treatment with methanol in the presence of acid catalyst, they yield the methyl ether of $\alpha$-terpineol. Thus, there is readily available a considerable selection of unsaturated terpenic compounds of the monocyclic series and which contain a single double bond in the ring and located at the 1-position in the ring.

It is known that the terpenic compounds, menthol, menthone, menthyl esters, carvone, carveol, carvyl esters, dihydrocarvone, dihydrocarveols and dihydrocarvyl esters are valuable ingredients of essential oils and are prized individually and/or in combination as flavors, perfume ingredients, constituents of various pharmaceutical preparations, etc. Also, their aromatic counterparts, thymol and carvacrol, are useful for such purposes and are produced from natural oils or by synthesis from various raw materials in substantial quantities. It is to be noted that these compounds represent derivatives of the hydroaromatic compound, p-menthane, oxygenated at the 2- or 3-positions and possessing unsaturation or not.

It is known to oxidize limonene with air or oxygen and to work up such oxidation products to obtain carvone and carveol. Such procedures as are known to the prior art leave much to be desired from the standpoint of yields and quality of products obtained. Further, such procedures as have been described have not provided easily separable and simple crude oxidation mixtures, but rather have resulted in complex mixtures of materials difficult to separate and have yielded much non-volatile matter unsuited to further separation and conversions. Prior art procedures for isolation of monocyclic terpenic oxidation products resulting from the reaction of gaseous oxygen and monocyclic terpenic compounds have failed to provide isolable and/or identifiable compounds other than those of superior stability, including carvone and carveol. We have found, however, by employing the methods of the present invention that it is possible to secure not only good yields of the known terpenic oxidation products, i.e., carvone and carveol from limonene, but also to secure good yields of valuable but less stable oxidation products and simultaneously to avoid formation of large quantities of non-volatile resinous material possessing low value. These less stable oxidation products include valuable precursors, not only of the carveol-carvone family, i.e., p-menthane derivatives oxygenated at the 2-position, but also valuable and hitherto unknown precursors of the menthol-menthone family, i.e., p-menthane derivatives oxygenated at the 3-position. A special novelty of the menthol-menthone family precursors lies in the fact that they themselves are not oxygenated at the 3-position but are oxygenated at the 1-position, and are convertible to the menthol-menthone family only by special methods such as those described below.

We have found that not only limonene, or its racemate, dipentene, is convertible to such valuable products, but that, in general, terpenes or terpenic compounds characterized as members of the p-menthane series and possessing a single ring double bond at the 1-2 position are suitable as raw materials for preparation of the valuable p-menthane type compounds oxygenated at the 2- and the 3-positions and containing unsaturation or not. Thus, compounds which are readily procurable from domestic sources and at low prices are readily converted to members of the spearmint and peppermint flavor groups. Suitable terpenes and terpenic compounds for such conversions include limonene, carvomenthene, $\alpha$-terpineol, esters of $\alpha$-terpineol, and ethers of $\alpha$-terpineol. The identity of other compounds suitable for conversions by our methods will be evident to those skilled in the art from a consideration of our present disclosures.

The value of the finished products, such as menthol, piperitone, carvone, etc., exceeds the value of the raw materials employed in our process by as much as several hundredfold. Furthermore, these essential oil, pharmaceutical, etc. ingredients are produced normally only as a result of highly skilled agricultural practices and many of them must be imported. Our invention thereby contributes substantially towards the desirable goal of producing essential oil ingredients from easily available and cheap domestic raw materials. A special novelty inherent in our invention is that many of these essential oil ingredients can be produced in optically active forms since the raw materials are available both in optically active form, as well as in racemic form. Other known methods of synthesis such, for example, as the hydrogenation of thymol to produce menthol, are capable only of yielding a racemic menthol.

It is accordingly an object of the present invention to provide an improved process for producing oxygenated products from terpenes.

Another object is to provide an improved process for treating the mixture resulting from the air oxidation of limonene.

A further object is to produce certain hitherto unknown alcohols.

An additional object is to provide a new method for the production of carveol, carvone and limonene-oxide.

Still another object is to provide a process for producing a mixture of terpenic oxidation products substantially free of secondary by-products which render difficult the separation and purification of the terpenic oxidation products.

Still a further object is to provide a process for producing optically active oxygenated terpenes.

Still another object is to provide an improved process for producing terpene oxides.

Other objects will be apparent to those skilled in the art from the following description of the invention.

It has been found that the foregoing objects can be accomplished when the air oxidation mixture of the terpene compound is treated with a reducing agent under non-acidic and preferably alkaline conditions. When treated in the preferred manner, the reaction mixture can be distilled fractionally to produce a terpenic oxide, a terpenic compound oxygenated at the 2-position, and the cis- and trans-forms of the terpenic compound oxygenated at the 1-position and possessing unsaturation at the 2, 3-position.

The reactions involved may be illustrated by using limonene as the raw material undergoing our treatments, as shown on the flow sheet.

FLOW SHEET

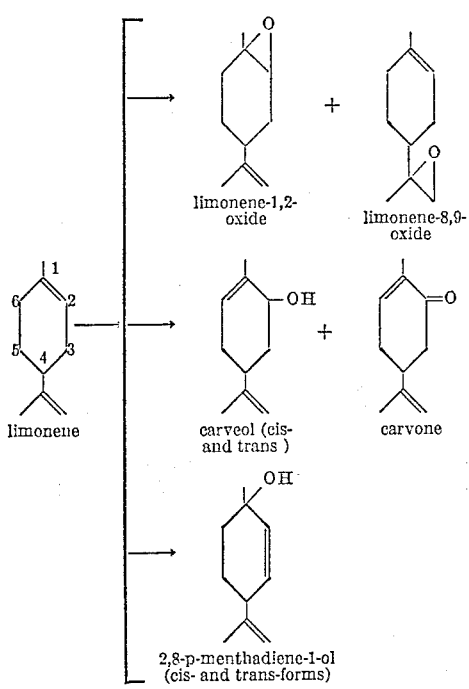

It is to be noted that each double bond in limonene is capable of epoxy formation. In general, however, it is the 1-2 double bond which is most easily epoxidized.

Limonene-1,2-oxide has been produced by perbenzoic acid oxidation of limonene by the prior art, but such types of peroxidation are, of course, expensive and are therefore less suited to economic production of epoxides. The limonene epoxides are optically active if produced from optically active 1,8-p-menthadiene, limonene, or are optically inactive when produced from racemic limonene, dipentene. Limonene-8,9-oxide has not been previously reported.

The carveol and carvone are not optically active to the extent that the limonene may be optically active. That is, substantial racemization occurs during their formation so that they tend to be racemic or possess only feeble optical activity although the starting limonene may be optically pure.

The 2,8-p-menthadiene-1-ol occurs in both cis- and trans-forms and is optically active when prepared from optically active limonene. It does not suffer substantial racemization in its manufacture and is capable of isolation not only as the cis- and trans-forms, but also as dextro- or laevo-rotatory forms, or as the racemic form. The 2,8-p-menthadiene-1-ol has not been previously reported.

These compounds as isolated by our methods may form 75% or more of the limonene oxidation products. It is to be specially noted that according to the widely accepted α-methylenic oxidation theory, it would be expected that isopiperitenol, 3-hydroxy-limonene, would be formed from limonene oxidation, and it would not be expected that the 2,8-p-menthadiene-1-ol would be formed. We find that, in fact, little or no isopiperitenol is formed by our process of oxidation and working up of the oxidation products. It is thus evident that special methods are required to convert limonene to p-menthane derivatives oxygenated at the 3-position and that, on the other hand, the oxidation of limonene followed by working up the oxidation product according to our methods does permit the production of compounds oxygenated at the 1-position, a result which is unexpected from a consideration of oxidation theory as outlined in the prior art.

As indicated, alkaline conditions are preferred for the decomposition of the initial oxidation products. The initial oxidation products of these suitable terpenic compounds consist of peroxides, and we find it desirable to reduce these peroxides under alkaline conditions prior to attempts to separate the various oxidation products from each other, since the peroxides are unstable and tend to decompose in undesirable directions when heated as in distilling them. When excess sodium sulfite is employed as the reducing agent, the reaction mixture should tend to remain alkaline due to hydrolysis of this salt of a weak acid. However, as the sulfite is consumed and converted to sulfate, the alkalinity induced by hydrolysis decreases so that alkalinity is maintained only if excess sulfite is present. Thus, in the absence of sulfite, the pH decreases, thus permitting, for example, hydration of the terpenic oxide which is attacked even by distilled water. Further, while perhaps water of pH 7.5 when cold will not attack the oxide appreciably, that same water when hot would attack it. Further, if the sulfite employed were slightly acidic, it would become much more acidic upon being oxidized. To avoid these undesirable possibilities, we prefer to add excess alkali, such as soda ash, caustic soda, etc., in small amount, suitably corresponding to one to three percent concentration in the aqueous phase. This alkali, furthermore, would neutralize any acidity present in the peroxidized terpenic material under treatment. By use of such a cheap safeguard, it is unnecessary to provide excess sulfite over that required for reduction and whose only purpose would be to maintain suitable alkalinity. Thus, while non-acidity is necessary to our invention, alkalinity is preferred.

Not only are epoxides attacked by water and aqueous acids, but also the 2,8-p-menthadiene-1-ols and their analogues are also attacked by water and by acids to form the allylomeric isopiperitenols, and their dehydration products providing the conditions are sufficiently severe. It is to be noted that while the isopiperitenols are desirable precursors of the menthol series of compounds, it is not desirable that they be formed prior to separation of the various limonene oxidation products, since they boil much closer to carveol and carvone than do the 2,8-p-menthadiene-1-ols. Through reduction of the peroxides under neutral, preferably alkaline conditions, we thus produce a limonene oxidation mixture which is readily separable into epoxides, p-menthane derivatives oxygenated at the 2-position and p-menthane derivatives oxygenated at the 1-position. We avoid the various decomposition products of the peroxides, oxides and other sensitive compounds and thereby avoid formation of a difficultly separable mixture containing large quantities of high boiling, tar-like products and unsuited to clean separations. It will be appreciated that in the foregoing explanation we have employed limonene as a specific example, but that similar considerations apply to the conversion of the other terpenic compounds to valuable oxidation products.

In carrying out our invention, we first produce a terpenic oxidation mixture rich in peroxides. The oxidation can be carried out over any suitable temperature range by passing oxygen or oxygen-bearing gases such as air through the terpenic material. The peroxide formation may be followed conveniently by determining the peroxide number of the oxidizing product at intervals. At lower temperatures, the peroxidation might be quite slow, while at temperatures of 80° to 90° C. there is some decomposition of the oxidation products. We prefer temperatures between 40° to 70° C. The exact temperature employed will depend somewhat upon the thermal stability of the terpenic peroxide being produced, upon the readiness with which the terpenic compound forms peroxides, upon the presence or absence of oxidation inhibitors in the terpenic compound being oxidized, and, in general, upon those factors well known to influence peroxide formation when unsaturated compounds are treated with gaseous oxygen. Furthermore, the duration of the oxidation will vary according to the temperature, oxygen concentration in the oxidizing gas, the particular degree of oxidation desired, etc. In general, we prefer to continue the oxidation to a peroxide value of about 1000 to about 2000. Material possessing lower peroxide numbers may be employed, but then larger quantities of unreacted terpenic material must be recycled to a new oxidation. Somewhat higher peroxide numbers may also be employed, but secondary oxidation products, etc. are formed in increasing quantities, and, in general, we therefore prefer to employ a material peroxidized only to around 1000 to 2000. A pure terpene hydroperoxide has a theoretical peroxide value of about 12,000 (see G. S. Fisher and L. A. Goldblatt, Ind. & Eng. Chem. 43, 671 (1951)), so that an air oxidized limonene of peroxide value of 1500 would contain about 12.5% peroxides. The actual content of oxidation products, in general, exceeds that which would be predicted from the peroxide value alone.

The peroxidized terpenic material may be produced in any suitable equipment capable of bringing about intimate contact of the terpenic compound being oxidized and gaseous oxygen, or air or other suitable oxygen-containing gas. Peroxidation may be accelerated somewhat by photochemical activation, by catalysts, etc.; however, we find it is not necessary to employ such activating influences. Peroxidation of unsaturates is known to be auto-catalytic, and therefore the induction period can be decreased by treating the peroxide-free terpenic material with suitable peroxides, including the peroxides of the terpenic material being oxidized.

The peroxidized terpenic material containing unreacted terpenic material can be subjected to separation processes, if desired, to concentrate the oxidation products before their reduction. Thus, it will be found that when a peroxidized limonene is shaken with aqueous methanol, the oxidation products, including the peroxides, will tend to concentrate in the aqueous methanol layer from which they can be recovered. We find, however, that such concentration of hydroperoxides or peroxides is not necessary, and, in general, we prefer to treat the entire peroxidized mass with a reducing agent and then recover unoxidized terpenic material as by means of fractional distillation. This recovered terpenic material is satisfactory for a succeeding oxidation.

Any reducing agent capable of absorbing oxygen from the air can be used. We have found sodium sulfite to be quite suitable, but other reducing agents, such as sodium sulphide, ferrous hydroxide, alkaline pyrogallol, pyroligneous acid made alkaline, etc., can be employed. Any suitable temperatures can be used, preferably below about 100° C., in order to prevent undue decomposition and undesirable thermal isomerizations of the products. The reducing agent is normally employed as an aqueous solution or suspension, but, of course, other suitable media can be employed.

The reduction is suitably conducted by intimately mixing the reducing reagent such as aqueous sodium sulfite solution with the terpenic peroxide. The reaction as generally conducted is mildly exothermic and the rate of reduction depends upon the nature of the reducing agent, the temperature, the identity of the peroxide being reduced, the agitation available, etc. The rate of the reduction can be determined suitably by measurement of the peroxide value of the organic layer or it can be measured by the rate of consumption of the reducing agent.

It is not necessary to continue the reduction until the peroxide number of the oxidized terpenic material is zero, and, in fact, it is difficult to remove the last traces of peroxides at a rapid rate in all cases. In general, we prefer to continue the reducing reaction until the peroxide value is about 50 and preferably lower, and, in general, it is not difficult to secure peroxide values of about 20 or less.

The treated terpenic layer can now be separated from the aqueous mildly alkaline and more or less spent reducing agent solution, and subjected to fractionation, preferably employing a good vacuum in the range of 10 to 100 mm., absolute, or even less. It will be found that in general the lowest boiling material will consist of unoxidized terpenic material, followed by fractions of the oxidation products. The lowest boiling oxidation products consist of the terpenic epoxides; then fractions rich in compounds oxygenated at the 1-position and possessing a double bond at the 2-position will distill. Compounds oxygenated at the 2-position will then distill and finally still higher boiling compounds are isolable. The proportions of these various classes of products will vary according to the exact details of the treatment employed. In general, however, if freshly peroxidized material is employed, we have found that of the total oxygenated terpenic material boiling above the recovered unoxidized terpenic material, there will be a substantial quantity of each of the classes of products specified. Thus, as will be seen from Example 1, a peroxidized limonene yielded roughly ⅕ limonene epoxides, ⅕ 2,8-p-menthadiene-1-ol, about ³⁄₁₀ carvone and carveol, about ¹⁄₁₀ higher boiling volatile oils and products of undetermined nature, as well as about ⅕ of much less volatile material. We have found, however, that some differences in the proportions of these classes of materials will be noted by operating under different reducing conditions and with various peroxidation products. Also, there may be some differences noted with the age of the peroxidized material.

High purity terpenic compounds need not be employed for the peroxidation and subsequent steps, but, of course, the purity of the terpenic material does influence the ease with which the various oxidation products can be recovered and purified. If the oxidation products are to be employed for purposes such as flotation or are to be used in applications which take advantage of their germicidal, wetting or solvent properties to which each of the oxidation products contributes to a degree, then it may not be desirable to fractionate the reduction product for isolation of the pure oxidation products, but the reduction product can simply be distilled or, in some cases, employed as such or after removal of unoxidized terpenic material and/or perhaps the epoxides. In such cases, mixtures of suitable terpenic raw materials can be employed at the oxidation and reduction steps, and mixed oxidation products arising from several terpenic materials can be thus prepared and used to good advantage for the purposes mentioned.

In some cases, impurities do not appreciably affect the quality of the oxidate. For example, certain saturated compounds such as p-menthane or even unsaturated compounds such as camphene, etc., do not peroxidize readily and are recovered unchanged and without producing oxidation products which would tend to contaminate the desired oxidate.

In general, it is quite satisfactory to separate the various oxidation products from each other by distillation, crystallization and combinations of these with other physical processes. However, the examples also contain certain illustrations of purification of products by chemical means. It will, of course, be obvious to those skilled in the art that other means than those specifically mentioned can be employed for purification and/or separation of the various products. Thus, alcohol carbonyl-containing mixtures can be purified as to one or more of the constituents by treatment with the reagents for the carbonyl group such as hydroxyl amines, semicarbazide, phenyl carbazide, Girard's Reagent, methyl alcohol, glycols, etc., and the reaction products then separated from unreacted material. Similarly, in addition to esterification, reagents for alcohol groups, such as boric acid, can be employed to effect either initial separations or purification of enriched fractions. The relative simplicity of the reduction mixture as compared to those produced by the prior art makes these methods feasible, the particular choice depending upon the circumstances and the possible value of the reaction products themselves.

As shown by the foregoing, the process of the present invention results in substantially increased yields of volatile oxygenated products which are readily recovered by distillation and crystallization. There is a minimum formation of undesirable secondary products, such as those which are produced by thermal decomposition of the terpenic peroxides or decomposition with steam. It is to be recognized in this connection that hot water or steam is sufficiently acidic to cause profound changes in the nature of the oxidation products.

It will be appreciated that a number of the oxidation products obtained using the process of the present invention are compounds which may exist in cis- and trans-forms. In general, both the cis- and trans-forms are isolable as will be seen from the examples.

As has been mentioned before, compounds corresponding to α-methylenic oxidation are by no means the exclusive products obtained by employment of our process. In each case, it is possible to isolate the epoxide of the olefinic material. These epoxides are valuable odorants and also may be converted into compounds which exist in essential oils. Thus, from carvomenthene we obtain carvomenthene oxide which may be readily converted into carvomenthone. Similarly, limonene-1,2-oxide is readily converted into carvenone and dihydrocarvone and related materials.

The value of the products oxygenated at the 2-position is quite evident. Thus, carveol and carvone which are obtained directly by employment of our process, as applied to limonene, are known to be constituents of spearmint oil and themselves individually are valuable as flavoring and odorant materials. The analogous products derived from α-terpineol are sobrerol and 8-hydroxycarvotanacetone, which can be converted to carveol and carvone, respectively, by known means. Similarly, terpineolmethyl ether, when treated by our process, would yield 8-methoxycarvotanacetol and 8-methoxycarvotanacetone, which can be treated for removal of the methoxy group so that members of the carvone-carveol series are available also from this starting raw material.

As pointed out above, isopiperintenol might be expected to be formed through the α-methylenic oxidation of limonene. We have been unable to isolate or identify isopiperitenol as being produced through employment of the process of the present invention. Further, piperitol might be expected to be produced by the α-methylenic oxidation of carvomenthene. We have been unable to isolate or identify piperitol as being so produced by the employment of the process of the present invention. It is thus very clear that the results achieved by our process could not be predicted from consideration of earlier oxidation theory. Furthermore, limonene, as has been stated, does produce substantial quantities of 2,8-p-menthadiene-1-ol and carvomenthene does produce 2-p-menthene-1-ol, compounds whose formation is not predictable from prior art. Thus, it is clear that no menthol precursor oxygenated in the 3-position exists in the oxidation products of limonene isolated by employment of our process. However, menthol precursors do exist in our oxidation products, since the tertiary alcohols, such as 2,8-p-menthadiene-1-ol, can be readily isomerized to such 3-oxygenated products. Thus, 2,8-p-menthadiene-1-ol can be treated with an acid such as hot water or by means of a dilute acid in the cold, so that 3-oxygenated products are formed. Thus, 2,8-p-menthadiene-1-ol is readily converted into a mixture containing isopiperitenol. The conversion is by no means complete, since an equilibrium exists between 2,8-p-menthadiene-1-ol and isopiperitenol under the conditions employed for the conversion. This equilibrium can be approached from either direction. Similarly, 2-p-menthene-1-ol derived from carvomenthene is readily converted into an equilibrium mixture of the unchanged tertiary alcohol and piperitol. We further find that such equilibrium mixtures contain all possible allylomers. Thus, by treating pure cis-piperitol or pure trans-piperitol or cis-2-menthene-1-ol or trans-2-menthene-1-ol with hot water, a mixture is formed containing all four of these allylomeric compounds. Such equilibrium mixtures can be fractionated, if desired, to recover those compounds oxygenated in the 3-position and which are capable of hydrogenation to menthol. The recovered tertiary alcohols can then be recycled to a new equilibration reaction mixture, and thus the tertiary unsaturated alcohols can be converted eventually entirely into the secondary alcohols capable of hydrogenation to menthol.

We find further that these allylic tertiary alcohols are readily oxidizable by means of chromic acid to the corresponding α,β-unsaturated ketone oxygenated at the 3-position. Thus, 2-menthene-1-ol readily yields piperitone in good yield when it is oxidized with chromic acid. Similarly, 2,8-p-menthadiene-1-ol yields isopiperitenone which may be readily hydrogenated to menthol or converted to piperitenone by isomerization or converted to thymol by means of heating with palladinized carbon.

It is evident from the above that special treatments of the oxidation products isolated by means of the process of the present invention are necessary in order to secure terpenic compounds oxygenated at the 3-position and including menthone, menthol, piperitol, piperitone, etc.

It will be appreciated by those skilled in the art that our oxidation products need not be separated prior to such special treatments as lead to the desirable 3-oxygenated products. Thus, for example, one can peroxidize limonene and subject it to our reduction treatment to secure a product rich in our oxidation products and which can be fractionated roughly to first remove unreacted limonene and limonene oxide and then a fraction rich in carveol, carvone, and cis- and trans-forms of 2,8-p-menthadiene-1-ol. This latter fraction can then be oxidized as by means of chromic acid to secure a mixture of carvone and isopiperitenone. A part of the isopiperitenone may be isomerized by this treatment or subsequent fractionation into piperitenone. The oxidate resulting from the chromic acid oxidation can then be fractionated to secure carvone, isopiperitenone and piperitenone. The latter two products can be converted to menthol by hydrogenation or to thymol by treatment with palladinized charcoal. Alternatively, if desired, the crude mixture of carvone and isopiperitenone and containing perhaps some piperitenone resulting from the isomerization of isopiperitenone can be subjected to treatment with palladinized charcoal prior to fractionation, and there will be secured a mixture of carvacrol and thymol. It is known that these materials can be separated by fractionation, etc. so that pure carvacrol and pure thymol can be isolated. Carvacrol is useful as an odorant and as an antioxidant. Thymol is a useful intermediate for preparation of various pharmaceutical preparations, and is also an antioxidant of the type employed in the paint and varnish industry. It is therefore evident that the crude oxidate mixture resulting from the process of the present invention can be worked up in a number of ways to provide useful compounds known to be of considerable economic importance.

2-Menthene-1-ol has been prepared previously by the treatment of cryptone with methyl magnesium halide. It is evident that it can be produced far more economically by the application of the process of the present invention to carvomenthene. Furthermore, it was not recognized by the prior art that this tertiary alcohol could be readily isomerized to piperitol or oxidized if desired to piperitone.

A more comprehensive understanding of the value of the process of the present invention will be attained by study of the following representative examples which illustrate the stereo-chemistry of the oxidation products resulting from our process and the means for converting these oxidation products into known and valuable compounds.

Example 1. Treatment of limonene d-Limonene was oxidized by passing air through it for a period of time until the peroxide value, D. H. Wheeler, "Oil and Soap" 9, 89 (1932), reached about 1400 to 2400. The theoretical peroxide value of a pure terpene hydroperoxide, $C_{10}H_{16}O_2$, is 11,890.

It was found that a peroxide value of about 500 could be attained with the particular equipment employed in six and a half days when the limonene was oxidized at about 25° C., in about 29 hours when oxidized at 50° C., and in about 5 hours when oxidized at about 80° C. However, in the latter case when oxidation was continued, a maximum peroxide value of 1000 was attained in 30 hours, but in 80 hours the peroxide value had dropped to only 70, thus indicating the tendency toward instability of the limonene oxidation system of peroxides at 80° C.

Table I below shows data obtained on oxidation of limonene at different temperatures but at approximately the same rate of air flow. The air was passed into the bottom of the container through a small bulb containing many small holes to secure better air dispersal. In some cases, commercial fritted glass dispersers were employed.

In experiments III, IV and V, Table I, the limonene was held at 80° C. until a peroxide value of 500 was obtained, then the temperature was decreased to minimize decomposition of the peroxide and held at 50° C. during the daytime (about 9 hours each day) for the remainder of the oxidation period, but the temperature was allowed to drop to about 25° C. overnight. Air was passed through the limonene continuously over the entire specified oxidation period and irrespective of temperature.

TABLE I

| Charge No. | I | II | III | IV | V |
| --- | --- | --- | --- | --- | --- |
| Original volume in cc.. | 3,670 | 4,000 | 2,320 | 4,440 | 4,555 |
| Temperature, degrees. | 25–30 | 50 | 80–50–25 | 80–50–25 | 80–50–25 |
| Time in days | 12 | 3.8 | 3.8 | 3.0 | 5.0 |
| Peroxide number | 1,850 | 2,370 | 1,580 | 1,500 | 1,430 |
| Percent peroxide | 15.5 | 20.0 | 13.3 | 12.6 | 11.8 |

The oxidized limonene products described in Table I were reduced individually by means of sodium sulfite, slightly alkaline, through addition of about 10% excess saturated sodium sulfite solution and agitation of the mixture. The reduction was somewhat exothermic and the temperature rose from about 25° C. to 70° C., but in some cases the reduction was not complete in a reasonable length of time unless the mixture was heated for several hours. Reduction of the peroxide value to about 30 was complete in about five hours at 100° C. or in about 9 to 10 hours at 70° to 75° C. These reduction times are only approximate, as considerable variation due to degree of agitation, presence of peroxide decomposition catalysts, etc., change reduction rates appreciably. After these oxidized limonenes were reduced by means of the alkaline sodium sulfite to peroxide values of 30 or below, they were separated from the aqueous salt phase and combined and the combined oils representing the reduction products derived from the oxidized limonene, Table I, were then subjected to fractional distillation at reduced pressures and by means of efficient fractionating columns. The many separate fractions were examined individually by means of infrared and, where applicable, ultraviolet spectrochemical analysis procedures. The following compounds were found to be present in the reduced limonene oxidation mixture:

(A) d-Limonene was recovered in pure form boiling at 58° C., at 10 mm. Its purity was equivalent to that of the starting material, and it was found to be capable of further oxidation by air in the same manner as disclosed above.

(B) The next higher boiling fractions consisted of limonene-1,2-oxide which had these properties: B.P. 77° C., at 10 mm., $\alpha_D^{25} + 54.2°$ (10 cm. tube), $n_D^{25}$ 1.4642, $d_4^{20}$ 0.929, which values are in good agreement with those reported by Simonsen, The Terpenes, volume I, 2d edition. It was further characterized by its infrared spectrum, characteristic absorption bands are shown in Table II, and by the following conversions:

TABLE II

Bands are reported in reciprocal centimeters (cm.$^{-1}$):

Limonene-1,2-oxide—761, 844, 890, 950, 1040, 1120, 1183.

Limonene-8,9-oxide—743, 765, 795, 842, 904, 915, 1018, 1048, 1071, 1152.

1-menthene-9-al—760, 800, 843, 885, 914, 1153, 1720.

α-2,8-p-menthadiene-1-ol—739, 817, 834, 891, 908, 951, 1105, 1200.

β-2,8-p-menthadiene-1-ol—724, 747, 815, 833, 890, 951, 996, 1122, 1203.

Dihydrocarvone—733, 893, 957, 1060, 1085, 1142, 1184, 1222, 1320.

8-cymenol—724, 820, 865, 954, 1020, 1095, 1115, 1140, 1170, 1260, 1512.

Carvone—804, 896, 1060, 1110, 1250.

Cis-carveol—810, 857, 890, 916, 999, 1035.

Trans-carveol—808, 858, 890, 944, 960, 1030, 1052, 1160, 1170.

(1) On shaking 10 cc. of this product with 20 cc. 1% sulfuric acid at room temperature, the temperature rose to 55° C. A solid limonene-1,2-glycol precipitated immediately. Filtered off and purified by recrystallization from hot water, it melted at 69–71° C., and showed $[\alpha]_D^{25} + 44.6$ (1 g. made to 10 cc. with acetone). These data are in good agreement with the literature for limonene-1,2-glycol.

(2) Limonene-1,2-oxide was hydrogenated at about 25° C. with platinum oxide catalysts and hydrogen pressure of 54 lbs./sq. in. or less. It absorbed one molecular equivalent of hydrogen to yield 1-p-menthene-oxide (carvomenthene oxide) which boiled at 75° C., at 100 mm., $d_4^{25}$ 0.909, $n_D^{25}$ 1.4490, and was characterized by the infrared absorption bands shown in Table II.

(3) Limonene-1,2-oxide was hydrated with 1% sulfuric acid and then sufficient 70% sulfuric acid was added to produce a reflux temperature of 112° C. The mixture was heated at reflux for 2 hours. The oil was separated, washed with caustic solution, and dried. Ultraviolet analysis showed a maximum absorption at 237 mμ and a specific extinction coefficient, $$\alpha = E_{1\,cm.}^{1/1}$$

of 52 (methanol as solvent) showing that the product contained the conjugated ketone, carvenone, in good concentration. The presence of a feeble optical rotation, $\alpha_D^{25} + 4°$ (10 cm. tube) and a weak absorption at 11.2 μ in the infrared region of the spectrum showed that the product contained some impurity, probably 8-menthene-2-one. About 18% cymene was also present as shown from the infrared spectrum of the product.

(4) Limonene-1,2-oxide, 17 g., and 2.55 g. of 5% palladium on charcoal was refluxed for 2 hours. The final reflux temperature was 205° C. The infrared spectrum of the filtered product showed it to consist of about 72% cymene and the remainder carvacrol.

(C) Infrared examination of the next higher boiling fractions boiling near 86° C., at 10 mm., showed they contained considerable tertiary alcohol and a compound which was not an alcohol and which showed a strong absorption band at about 794 cm.$^{-1}$ and a strong band at 842 cm.$^{-1}$, which is in the region characterized by epoxy absorptions. Fractions richest in this latter compound showed weakest infrared absorptions in the region characteristic of the $CH_2=C<$ group, and it was concluded after making the conversions described below that this compound was limonene-8,9-oxide. It was found that by fractionally redistilling such fractions at 10 mm., followed by refraction of appropriate fractions at 100 mm. pressure, that the non-alcoholic compound could be isolated readily as a pure material, boiling at 140° C., at 100 mm., $d_4^{25.5}$ 0.9366, $n_D^{25}$ 1.4722, $[\alpha]_D^{25}$+90.4°, and that it was further characterized by its infrared bands shown in Table II. Absorption bands at about 6.1 and 11.2 in the infrared region were absent, showing that the $CH_2=C<$ group was absent. No hydroxyl absorptions were present in the infrared spectrum of this product.

From the redistillation of the crude limonene-8,9-oxide at 100 mm., there remained a higher boiling residue which was distilled at 10 mm. and from which 1-menthene-9-al was isolated as a fraction boiling at about 92° C., at 10 mm. This product was formed by pyrolysis of the 8,9-oxide during the prolonged heating period involved in the fractionation. It showed $n_D^{25}$ 1.4730, $\alpha_D^{25}$+105° (10 cm. tube), and possessed a specific extinction coefficient, $$\alpha = E_{1\ cm.}^{1\%}$$

of 0.204 at the wavelength of maximum absorption at about 290 mμ. The ultraviolet spectrum is characteristic of a simple non-conjugated aldehyde, whereas the absorption band at 800 cm.$^{-1}$ in the infrared region shows the presence of a trisubstituted ethylene band similar to the 795 cm.$^{-1}$ band possessed by the oxide. The 1-menthene-9-al was also characterized by condensing it with aqueous acetone in the presence of a small amount of sodium hydroxide whereby there was formed the aldol which showed on infrared analysis both hydroxyl and carbonyl absorptions.

Limonene-8,9-oxide was hydrated by shaking it with 1% sulfuric acid. The viscous glycol could not be readily crystallized, but its infrared spectrum showed the presence of both tertiary and primary alcohol absorptions, and it was therefore limonene-8,9-glycol. This glycol boiled at 72° C., at 1.2 mm., $n_D^{25}$ 1.5010. When the glycol was refluxed with 25% sulfuric acid at 109–111° C. for thirty minutes, there was obtained a mixture of an unknown carbonyl material and a primary alcohol thought to be 1,4(8)-menthadiene-9-ol.

A crude fraction boiling at 86° C., at 10 mm., from the 10 mm. pressure distillation, substantially identical with the product described in the first paragraph of this section and consisting of about 45% limonene-8,9-oxide and about 55% of tertiary alcohol identified (see below) as α-2,8-menthene-1-ol, was hydrogenated in two batches with platinum oxide and 30 to 50 lbs. hydrogen. The first batch absorbed about 0.14 mole of hydrogen for 15 grams of crude fraction and the second batch absorbed 0.384 mole of hydrogen for 0.31 of crude fraction when the molecular weight of the fraction was assumed to correspond to that of limonene-8,9-oxide. The two batches of hydrogenated product were combined and fractionated. It was found that now two monoxides were present corresponding to the cis- and trans-forms of p-menthene-8,9-oxide. The lower boiling, considered the cis-form because of its higher refractive index, boiled at about 78° C., at 10 mm., and possessed $n_D^{25}$ 1.4518. The trans-p-menthene-8,9-oxide boiled at about 82° C., at 10 mm., and showed $n_D^{25}$ 1.4505. The accompanying mixture of saturated and unsaturated alcohols resulting from hydrogenation was separable from the two oxides, since the boiling point of the tertiary alcohol was not decreased by hydrogenation to the extent that this treatment reduced the boiling point of the limonene-8,9-oxide. The cis- and trans-p-menthene-8,9-oxides were saturated to bromine.

(D) The next higher boiling product at 10 mm. pressure was α-2,8-p-menthadiene-1-ol, which when purified boiled at 88.5° C., at 10 mm., and showed $d_4^{28}$ 0.9279, $n_D^{25}$ 1.4869, F.P. 19.0° C., $\alpha_D^{28}$+58° (10 cm. tube), $[\alpha]_D^{28}$+62.5°.

Purification of this compound was accomplished by refraction at 10 mm. of fractions boiling in the range 86 to 89° C., and produced directly from the crude limonene oxidation products and originally processed at 10 mm., and which contained limonene-8,9-monoxide as the lower boiling impurity. Some of the fractions enriched in this lower boiling tertiary alcohol by the refractionation at 10 mm. approached a purity of about 90%. These fractions rich in the tertiary alcohol were partly frozen by storage at low temperatures and the partly frozen fractions were then centrifuged to secure purer solid alpha-2,8-p-menthadiene-1-ol which contained a little carbonyl material, which was then removed by treatment of these fractions with hydroxylamine. Fractionation of this product treated to convert carbonyl compounds to oximes resulted in the pure compound possessing the physical properties listed above.

The location of the hydroxyl group at the 1-position was established by saturating the tertiary alcohol with hydrogen using platinum oxide (whereupon two moles of hydrogen was absorbed per mole of alcohol), and the resulting saturated alcohol, identical with one of the alcohols produced by air oxidation of p-menthane, was dehydrated with clay plus phosphoric acid to form 1-menthene. The infrared spectrum of the unsaturated alcohol showed the presence of a terminal methylene linkage as well as the presence of a symmetrically disubstituted ethylene linkage.

A sample of α-2,8-p-menthadiene-1-ol (13.6 g.) was oxidized by adding it to a solution of 9.76 g. $Na_2Cr_2O_7$ in 39 cc. water, and then to this mixture 27 g. of 50% $H_2SO_4$ was added dropwise so that the temperature did not exceed 39° C. The mixture was allowed to stir for 30 minutes and the oil was extracted with 50 cc. of pentane. After washing with aqueous $Na_2CO_3$ solution, the pentane solution was dehydrated with anhydrous $Na_2SO_4$ and evaporated to leave 45% alcohols and 55% isopiperitenone which was identified and estimated quantitatively by means of UV and IR spectra. The alcohols were isopiperitenol, and both the α- and β-forms of 2,8-p-menthadiene-1-ol.

A mixture, 840 g., consisting of about 80% α-2,8-p-menthadiene-1-ol, about 15% limonene-8,9-oxide and a small quantity of carbonyl compounds was treated with about 980 cc. distilled water, and this mixture was heated with stirring at about 95–100° C. for two hours. The oil was then separated and fractionated at 10 mm. to recover fractions in unreacted α-2,8-p-menthadiene-1-ol and limonene-8,9-oxide, β-2,8-p-menthadiene-1-ol, isopiperitenol and limonene-8,9-glycol. The isopiperitenol was recovered in 41% yield based on the alcohol content of the starting material. There was no apparent loss of optical activity of the 2,8-p-menthadiene-1-ols resulting from this treatment. The fraction richest in isopiperitenol was about 92% purity and showed $\alpha_D^{25}$+36.4° (10 cm. tube). Limonene-8,9-glycol was the chief constituent of the residue.

Selective hydrogenation of α-2,8-p-menthadiene-1-ol in methanol solution with platinum oxide and sufficient hydrogen at pressures below 50 lbs./sq. in. to correspond to saturation of one double bond produced a product which contained no terminal methylenic absorption in the infrared region, but the absorption characteristic of the symmetrically disubstituted ethylenic linkage at the 2-3 position remained. This selectively hydrogenated product was identified as α-2-menthene-1-ol identical with a sample of this material produced by gaseous oxygen oxidation of carvomenthene and working up the products therefrom as described in another section.

Selective hydrogenation of α-2,8-p-menthadiene-1-ol containing about 10% limonene-8,9-oxide using 1.5% of a commercial nickel catalyst at pressures up to 575 lbs./sq. in., and a maximum temperature of 170° C., and limiting hydrogen absorption to about one mole per mole of alcohol, produced a product which on fractionation yielded 7% limonene, a trace of low boiling carbonyl compounds, 10% limonene-8,9-oxide, unchanged, 65% 2-menthene-1-ol, 10% β-terpineol of the same form as is obtained by dehydration of cis-terpin hydrate, 5% of higher boiling alcohol and 2.5% still residue.

When 17.7 g. of α-2,8-p-menthadiene-1-ol was treated with 20 g. acetic anhydride and 2 g. anhydrous sodium acetate at 115°±5° C. for 2.5 hours, there was obtained an esterification mixture which was then washed with water, sodium carbonate, then more water. The product was isopiperitenyl acetate identical with the product obtained by acetylation of a pure sample of isopiperitenol. Furthermore, crude mixtures of α-2,8-p-menthadiene-1-ol, about 80% purity, remainder largely limonene-8,9-oxide, yielded similar esterification mixtures which could be fractionated to yield fractions of boiling point about 91° C., at 1 mm., rich in isopiperitenyl acetate and possessing a very pleasant fruity odor. It is believed that piperitenyl acetate was always present to some extent in such crude and such fractioned products, since the absorption characteristic of the terminal methylenic group is weaker than would be expected for pure isopiperitenyl acetate.

These reactions and the spectrum data presented in the table of infrared spectra definitely show this lower boiling tertiary doubly unsaturated alcohol to be one of the possible cis-trans forms of 2,8-menthadiene-1-ol, but since it is difficult to decide with certainty which form it is, we describe it as the "alpha" form.

A sample of α-2-menthene-1-ol, 311 g., and containing about 40% p-menthane-8,9-epoxide and produced by selective hydrogenation of a crude fraction of α-2,8-p-menthadiene-1-ol was heated with an equal weight of water at reflux. A sample withdrawn at the end of one hour refluxing showed on infrared analysis a 30% decrease in α-2-menthene-1-ol and a corresponding formation of β-2-menthene-1-ol. At the end of two hours and twenty minutes, another sample was withdrawn and found to contain a still higher content of β-2-menthene-1-ol. At the end of three hours and forty minutes of refluxing, the epoxide content had decreased appreciably and the ratio of α- and β-forms of 2-menthene-1-ol had not changed, but the total 2-menthene-1-ol had decreased somewhat. At the end of five and a half hours of refluxing, the epoxide content was further decreased and though the ratio of α- and β-forms of 2-menthene-1-ol had not changed, their total had decreased slightly. Piperitol could not be positively identified as being present in this complex final reaction mixture from infrared data. The mixture was then fractionated, first at 10 mm., then when the head temperature reached 92.5° C., the pressure was reduced to 1.5 mm. The lower boiling fractions contained α-2-p-menthene-1-ol contaminated with some unreacted epoxide, then fractions rich in β-2-menthene-1-ol were collected, B.P. 89–92.5° C. The best of such fractions contained little or no epoxide and froze at 17° C. The α- and β-forms of 2-menthene-1-ol were recovered by this fractionation in approximately equal proportions. After reducing the pressure to 1.5 mm., and completing the removal of the β-form of 2-menthene-1-ol, fractions rich in trans-piperitol were collected, boiling at 85° C., and identified by comparison of its infrared spectrum with that of a known pure standard. Its optical rotation was $\alpha_D^{25}$ −33.6° (10 cm. tube), F.P. −4° C., and the total yield of piperitol was about 10%.

There remained a somewhat viscous still residue which consisted primarily of 8,9-menthene glycol.

A sample, 159 g., of α-2-p-menthene-1-ol, produced by selective hydrogenation of crude α-2,8-p-menthadiene-1-ol, and containing about 30% 8,9-menthene-epoxide and a trace of β-2-p-menthene-1-ol was treated with 160 g. 1% aqueous sulfuric acid and the mixture was agitated at 24–31° C. for 3 hours. An equilibrium consisting of about equal amounts of α- and β-2-p-menthene-1-ol was obtained and the epoxide was almost completely converted to glycol. The mixture was treated for an additional two and a half hours and little further change was produced in the infrared spectrum of the product which showed that the α- and β-forms of 2-menthene-1-ol were still present and in the same proportion though in slightly less total quantity. This mixture of products was separated from the acid and washed thoroughly with sodium carbonate, then fractionated. There was much dehydration of the alcohols on fractionation, since the products recovered were largely α- and β-phellandrene and some α-terpinene as well as a little cymene and 1-menthene. No unsaturated tertiary monohydric alcohols were recovered, but a little p-menthane-1-ol was obtained resulting from the disproportionations occurring during the treatment. A high boiling ether remained as a still residue.

Further experiments showed that the alcohol mixture resulting from acid isomerization may be suitably treated by excess hot alcoholic-aqueous sodium hydroxide to destroy all traces of acid catalyst and unstable sulfuric esters so that fractionation of this acid catalyst-free material can be accomplished without dehydration and so that piperitol can be recovered, as well as the 2,8-p-menthene-1-ols and with very little, if any, hydrocarbon formation.

To clearly show the equilibrium character of allylomerization of the 2-menthene-1-ols and piperitol, a sample of pure trans-piperitol, 11.6 g., was agitated with 50 cc. water at reflux for one hour. A sample of the oil separated from this reaction mixture was analyzed by infrared methods and was shown to consist of about equal proportions of the α- and β-forms of 2-menthene-1-ol, together with about 10% piperitol. This experiment shows that these compounds are very readily equilibrated. Furthermore, cis-piperitol is also a member of any such equilibration system, but apparently it is present in much smaller quantity than is the trans-piperitol.

(E) β-2,8-p-methadiene-1-ol when purified boiled at 92° C. (at 10 mm.), and showed $d_4^{26}$ 0.9280, $n_D^{25}$ 1.4819, F.P. 19.5° C., $[\alpha]_D^{26}$ +135.4° (homogeneous).

Purification was accomplished by freezing fractions from the fractional distillation of the sodium sulfite reduced limonene oxidation products followed by centrifuging of the partly solidified mass to remove impurities as liquid products. The solid product of intermediate purity was melted, again partly frozen and this product was centrifuged to obtain the pure β-2,8-p-menthadiene-1-ol corresponding in physical properties to those specified above. The impurities which were removed by this purification procedure from fractions rich in this β-form of the menthadiene-1-ol were small amounts of carvone and the α-form of the alcohol, as well as traces of other compounds.

(1) Pure β-2,8-p-menthadiene-1-ol was saturated with hydrogen, 2 moles of hydrogen being required. Hydrogenation was accomplished at pressures below 60 lbs./sq. in. with platinum oxide and at room temperature. The saturated alcohol was identical with one of the alcohols produced by air oxidation of p-menthane. On dehydration of this saturated alcohol with clay plus phosphoric acid, 1-menthene was produced and identified by infrared methods, thus showing that the tertiary hydroxyl group was attached to the 1-position of the p-menthane skeleton. Also, infrared analysis of the doubly unsaturated tertiary alcohol showed the alcohol to be tertiary and that there was present a symmetrically disubstituted ethylenic linkage and also a terminal methylene linkage.

(2) On selective hydrogenation with platinum oxide under conditions similar to those described above but permitting absorption of only one mole of hydrogen, an unsaturated alcohol was formed which was identical with the β-form of 2-menthene-1-ol produced by treatment of air oxidation products of carvomenthene. Thus, the terminal methylene group had been hydrogenated preferentially.

(3) Under the same conditions but with Raney nickel catalyst, there was formed about a 50-50 mixture of optically active β-2-menthene-1-ol, B.P. about 88° C., at 10 mm., and a β-terpineol (8-menthene-1-ol) which were separated easily by fractional distillation at 10 mm., the boiling point of the β-terpineol being 96.5° C., at this pressure. The β-terpineol was different from the known β-terpineol obtainable by dehydration of cis-terpin hydrate, as shown by the infrared spectrum of this product, but its identity was established by the fact that infrared analysis showed it to contain a tertiary hydroxyl group and a terminal methylene group, and further, it hydrated with sulfuric acid catalyst to cis-terpin of M.P. 103–104° C. The presence of trans-terpin in the crude terpin is not excluded. However, this hydration, accomplished by shaking the alcohol with about four volumes 25% sulfuric acid for a total of seven hours, did not provide a high yield of the terpin, only about 40%, and the oil remaining at the end of the hydration and filtered off from the solid terpin now showed no methylenic absorption in the infrared and was assumed to be largely γ-terpineol. This new β-terpineol was purified further by recrystallization from heptane and then redistilled. It then showed M.P. 36° C., $d_4^{27}$ 0.923, $n_D^{25}$ 1.4779 (supercooled), $\alpha_D^{25}$ +0.5° (10 cm. tube).

(4) Three-hundred and seventy-five grams of β-2,8-p-menthadiene-1-ol of about 82% purity was treated with 367 g. of sodium dichromate in 1468 g. water. To this mixture was added 1015 g. of 50% sulfuric acid with agitation and dropwise over a period of 2 hours. Cooling was employed to maintain the temperature below 36° C. Five-hundred ml. of heptane was added, and the phases separated. After washing the oil phase twice with 100 cc. portions of water, once with 100 ml. saturated sodium carbonate and twice more with water, the oil was dehydrated with anhydrous sodium sulfate. From a small sample the heptane was removed under vacuo and the heptane-free residue was analyzed by infrared methods to show it consisted of 30% alcohols, remainder largely isopiperitenone. No piperitenone was present in this sample. The bulk of the heptane solution was stripped of solvent at atmospheric pressure and the residue was fractionated at 10 mm. Initial fractions consisted of the alcohol and intermediate fractions were almost pure isopiperitenone, B.P. 109–110° C., $\alpha_D^{25}$ +68.3° (10 cm tube). Higher boiling fractions became progressively richer in the optically inactive piperitenone, B.P. about 114° C., for the fraction richest in this compound, thus demonstrating the easy conversion of isopiperitenone to piperitenone.

(5) Ten grams of β-2,8-p-menthadiene-1-ol, purified by recrystallization, was refluxed with boiling water and samples of oil were withdrawn at intervals for infrared analysis. It was found that at the end of one hour refluxing, the oil cointained 39% isopiperitenol, at the end of three hours refluxing 44%, and at the end of seven hours 34%. The spectra of the samples also showed that both α- and β-forms of 2,8-menthadiene-1-ol were present in these isomerization mixtures, thereby showing the conversion of the β- to the α-form of 2,8-menthadiene-1-ol.

(6) Sixteen-hundred and twenty grams of a fraction of oxidized limonene derivatives recovered by the prescribed procedures and containing about 85% β-2,8-p-menthadiene-1-ol was isomerized by boiling and agitating it with 2100 ml. of distilled water for 3 hours. Fractionation produced isopiperitenol boiling at about 98–99° C., at 10 mm., in about 42% yield based on the β-tertiary alcohol in the crude starting fraction. The lower boiling fractions of the water isomerizate consisted of a mixture of the α- and β-forms of the tertiary alcohol. In the highest boiling fractions there occurred more glycol than could be accounted for by hydration of the limonene-8,9-oxide present in the crude starting material, thus indicating some hydration of the tertiary alcohols and/or the isopiperitenol.

(7) Agitation of a sample of the pure β-tertiary alcohol with an equal volume of 2.5% sulfuric acid at room temperature for one hour produced a product which consisted largely of the α- and β-forms of the tertiary alcohol, together with smaller quantities of isopiperitenol and hydration products. Analysis was accomplished by means of infrared analysis.

The cis- and trans-isopiperitenols have very similar infrared spectra but can be distinguished by examination of a few characteristic bands. Thus, the absorption band at about 8.7μ is common to both forms as are the bands at about 6.09 and the broad band at 11.0–11.4μ which are characteristic of the $CH_2=C<$ portion of the isopiperitenyl group. The latter absorptions are, of course, also common to the α- and β-forms of the tertiary alcohols. It was found satisfactory to estimate total isopiperitenol, both forms, by measurement of the optical density of the 8.7μ band which is not interfered with appreciably by the tertiary alcohols. However, to distinguish between cis- and trans-isopiperitenol in mixtures by infrared methods is more difficult, since the characteristic bands of the individual forms are less sharp and clean. Thus, cis-isopiperitenol shows an absorption at 10.43μ and the trans-form at 10.37μ and semiquantitative analysis can be made using these bands, though they are not ideal for this purpose. When optically pure limonene is converted to the mixed isopiperitenols, it is, however, possible to employ optical rotation measurements for quantitative estimates of cis- and trans-forms.

The isopiperitenol produced by isomerizing the α- and β-forms of 2,8-p-menthadiene-1-ol consists of a mixture of the cis- and trans-isopiperitenol with trans- predominating. Thus, fractions rich in isopiperitenol produced by isomerizing the 2,8-p-menthadiene-1-ols derived from citrus d-limonene were combined and refractionated at 10 mm. pressure, to obtain fractions of 98 to 99.5% purity as measured by the optical density of the band at 8.7μ, common to both forms of isopiperitenol. These fractions which boiled in the neighborhood of 98 to 99° C,. and which showed practically identical optical densities at 8.7μ differed substantially in their optical rotation and in the absorptions in the infrared region at 10.43 and 10.37μ. Thus, fractions distilling first showed high dextro-rotation, the highest being +41.35° (10 cm. tube) and showing maximum absorption at 10.43μ, while succeeding isopiperitenol fractions which boiled but a few tenths of a degree higher showed decreasing rotations and loss of optical density at 10.43μ and the presence of an absorption at 10.37μ became more evident. Such a higher fraction showing 99.5% purity, as judged by the optical density of the band at 8.7μ, exhibited a rotation of +2.09° (10 cm. tube). All fractions showed practically constant refractive index, 1.4928 to 1.4933 at 25° C.

In attempting to purify an isopiperitenol fraction resulting from isomerization of 2,8-p-menthadiene-1-ol from d-limonene and showing $\alpha_D^{26}$ +21.1 (10 cm. tube) and showing 97% purity as measured by the 8.7μ absorption band, it was converted to the p-nitrobenzoate which was subjected to recrystallization and the product of M.P. 102–104° C. was saponified to yield 10% of isopiperitenol of $\alpha_D^{25}$ −27.5° (10 cm. tube) and which showed little or no absorption at 10.43μ but a distinct band at 10.37μ, thus showing it to be the trans-isopiperitenol. This experiment indicates that the trans-isopiperitenol is most easily isolated by processing such mixed isopiperitenol fractions in this manner, but it is also possible that trans-isopiperitenol is produced from cis-isopiperitenol during the conversion steps involved.

Numerous hot water isomerizations of the two individual 2,8-p-menthadiene-1-ols and trans-isopiperitenol, as well as mixtures of these, showed that the isomerization product always contained a mixture of the two tertiary and the two secondary alcohols and therefore an equilibrium is formed under such isomerization conditions, though, of course, reaction kinetics and exact isomerization conditions will determine the composition of the incompletely equilibrated mixtures produced by partial equilibration procedures.

(F) Carvone was found to be present in the higher boiling fractions of β-2,8-p-menthadiene-1-ol and in lower boiling cuts of carveol. Such fractions richest in carvone boiled in the range 103 to 105° C., at 10 mm. Identification and quantitative estimation of carvone was accomplished by means of infrared and ultraviolet spectrometry. Optical standards employed were based on the optical properties of a recrystallized pure carvone.

It was found that carvone of good purity could be produced by chromic acid oxidation of mixed carvone-carveol fractions using procedures substantially identical with that shown for the oxidation of menthol to menthone in Gilman and Blatt, "Organic Synthesis," Collective Volume I, 2nd Edition, page 340, and using a similar excess of oxidizing agent over that required for the conversion of alcohol to ketone.

(G) Carveol fractions of highest purity boiled at 106–110° C., at 10 mm. Both cis- and trans-carveol were present, as shown by the infrared spectra of the fractions and by the fact that such fractions differing somewhat in spectra gave carvone of substantially identical purity.

(H) Fractions boiling above carveol contained some carbonyl, largely hydroxyl compounds, as shown by infrared analysis. One such fraction on treatment with palladium on charcoal at reflux temperature produced carvacrol.

(I) The residue remaining in the still pot at 140° C., and 10 mm. pressure, was a thick, viscous product while warm and a solid on cooling to room temperature.

A sample of the residue was treated with 35% sulfuric acid at 115 to 129° C., for ninety minutes while distillate was being removed. Distillation of the treated residue and the oil distillate collected during treatment yielded about 35% volatile oils consisting largely of p-cymene but also containing a substantial amount of carbonyl compounds, thus showing that the residue contained polyhydroxy compounds and probably ethers which split under the influence of the acid treatment.

Some variation in yields of specific oxygenated limonene derivatives were experienced from various limonene oxidations, followed by reduction with various reducing agents and isolation of the products by distillation. However, such results were similar and the following data indicates results from a typical operation where limonene is peroxidized to produce a product of peroxide value of about 1500 to 2400 and then reduced under alkaline conditions. Here the yield of products is shown based on recovered total oxidation products boiling above limonene:

| | Percent |
|---|---|
| Limonene-1,2-oxide | 16 |
| Limonene-8,9-oxide | 3 |
| Total 2,8-p-menthadiene-1-ol | 21 |
| Carvone | 7 |
| Carveol | 23 |
| Higher boiling volatile oil | 3 |
| Undetermined, including errors of analysis and possibly other compounds | 7 |
| Distillation residue | 20 |

*Example 2.—Treatment of carvomenthene*

Carvomenthene, 17.1 kg., about 21 liters, produced by hydrogenation of d-limonene and containing approximately 20% p-menthane and 2% cymene was maintained at 70–80° C. and air was passed through it by means of a fritted glass pencil until the peroxide number rose to about 1500. About 13 hours was required for this autoxidation. The oxidation mixture was then stirred vigorously at 85–90° C. for 4 to 5 hours with a saturated sodium sulfite solution corresponding to about 17 moles of sodium sulfite. At the end of this time the peroxide number was about 25.

The reduced product was then fractionated at 100 mm. pressure to remove the unreacted carvomenthene which amounted to 77% of the reaction product. The carvomenthene was of suitable quality for further oxidation. The pressure then reduced to 10 mm. in order to fractionate the oxygenated material. For the latter operation a 4 foot by 2 inch Stedman-type column was employed at a reflux ratio of about 10:1, though experience indicated that higher reflux ratios should be employed to secure higher purity of individual fractions. About 85% of the oxygenated products were volatile under these conditions and they boiled over the range 75 to 127° C. Infrared and ultraviolet spectrograms were made for many of the fractions and these indicated the number of compounds present as well as their general structure and quantity. The following compounds, listed in order of their increasing boiling points, were found to be present:

(A) Carvomenthene oxide boiled at 75° C., at 10 mm., $d_4^{25}$ 0.909, $n_D^{25}$ 1.4490, $\alpha_D^{25}$ +42° (10 cm. tube). It was obtained relatively pure on the initial distillation. The major infrared absorption bands of carvomenthene oxide were found to occur at the following wavelengths ($\mu$): 6.8, 6.86, 6.93, 7.26, 7.97, 8.2, 8.37, 8.87, 9.62, 9.8, 10.57, 10.88, 11.05, 11.5, 11.87, 13.1. The absorption bands at 11.87 and 13.1$\mu$ were characteristic of epoxides. There were no absorptions attributable to alcohols or to carbonyl compounds.

Upon refluxing carvomenthene oxide with 40% sulfuric acid solution for one hour, carvomenthone was formed in about 90% yield. Carvomenthone was identified qualitatively and quantitatively by means of infrared analysis, whereby the spectrum of the crude reaction product was compared with the spectrum of a standard sample of carvomenthone.

Carvomenthene oxide was also produced by reducing a sample of limonene oxide of high purity in the presence of platinum oxide at hydrogen pressures of less than 60 lbs./sq. in. and at room temperature. The infrared spectrum of the carvomenthene oxide produced in this manner was identical with that of the carvomenthene oxide produced by the air oxidation of carvomenthene thus further confirming the identity of the later product.

Carvomenthene oxide was also converted to the corresponding glycol of boiling point about 160° C., at 2 mm., and solidifying readily on cooling. The conversion was accomplished by shaking carvomenthene oxide with 2% sulfuric acid. The reaction mixture warmed spontaneously and sufficient heat was generated to form a little carvomenthone by rearrangement of the carvomenthene glycol.

The physical properties and the conversions specified above adequately identify the compound boiling at 75° C., at 10 mm., as carvomenthene oxide.

(B) α-2-p-menthene-1-ol was the major compound occurring in fractions boiling close to 85° C., at 10 mm. pressure. Such fractions as were shown by infrared analysis to be rich in this compound were subjected to refractionation, whereby a product of good purity was obtained. This product showed boiling point 85° C. at 10 mm., $n_D^{25}$ 1.4698, $[\alpha]_D^{25}$ —17.2, $d_4^{25}$ 0.915, F.P. 6–8° C. Identification and characterization of this compound was accomplished as follows:

(1) The major infrared absorption bands characteristic of this product occur at the following wavelengths ($\mu$): 3.0, 6.86 (broad), 7.3 (broad), 8.10, 8.26, 8.55, 8.87 (broad), 9.05, 9.24, 9.42, 9.90, 10.07, 10.33, 10.58, 10.85, 11.60, 12.20, 12.40 and 13.52. The absorption at 3.0$\mu$ shows the presence of a hydroxyl group and the broad band at 8.87$\mu$ shows that the hydroxyl group is tertiary. The absorption at 13.52$\mu$ represents an absorption due to the symmetrically disubstituted ethylenic group which can occur only between the 2- and 3-positions on the p-menthane skeleton.

(2) Reduction of the alcohol at pressures below 60 lbs./sq. in. and at atmospheric pressure employing platinum oxide catalyst produced the same alcohol as that derived from the reduction of the β-terpineol which is obtained from dehydration of cis-terpin hydrate. The identity of the p-menthane-1-ol samples from the two specified reactions was established by infrared methods. This conversion established the location of the hydroxyl group at the 1-position on the p-menthane skeleton. Also, the steric relationship of the methyl and isopropyl group must be the same in α-2-p-menthene-1-ol as that which obtains between the methyl and isopropenyl groups in the β-terpineol from cis-terpin hydrate.

(3) The tertiary alcohol was dehydrated by heating 10 cc. of it with 0.7 cc. 85% phosphoric acid at the boiling point of the mixture for about 20 minutes. An infrared spectrum of the reaction product showed that the reaction product contained α-terpinene and α-phellandrene in the ratio of about 7 to 3. It is known that α-phellandrene isomerizes to α-terpinene in the presence of acids, and therefore it is likely that the dehydration product of the tertiary alcohol was α-phellandrene and that part of this α-phellandrene was isomerized to α-terpinene under the conditions of the dehydration.

(4) Further confirmation of the position of the hydroxyl group was obtained when the dihydro-derivative was dehydrated by means of hot phosphoric acid and 1-menthene was obtained almost exclusively as the dehydration product.

(5) The presence of a single double bond in the unsaturated tertiary alcohol was shown by the fact that only one mole of hydrogen per mole of alcohol was absorbed on subjecting the unsaturated alcohol to hydrogenation.

(6) 2-p-menthene-1-ol was oxidized by means of the same type procedure as outlined in "Organic Synthesis," supra, for the oxidation of menthol to menthone. Infrared and ultraviolet analysis of the reaction product showed that it consisted of over 60% piperitone. When this crude reaction product was subjected to a distillation, the best fraction obtained consisted of approximately 80–85% piperitone and showed an optical rotation of approximately +42° (10 cm. tube).

(C) β-2-p-menthene-1-ol was the major compound present in fractions boiling at about 90–92° C., at 10 mm. When fractions rich in this compound were purified by refractionation, a high purity product was obtained showing boiling point 91° C., at 10 mm., $n_D^{25}$ 1.4729, $[\alpha]_D^{25}$ +69.2, $d_4^{25}$ 0.915. This material was identified and characterized as follows:

(1) The infrared spectrogram of this compound showed major absorption bands at the following wavelengths ($\mu$): 3.0, 6.87, 7.24, 7.33, 7.52, 8.2 (broad), 8.51, 8.87 (broad), 9.23, 9.45, 10.20, 10.52, 10.86, 11.08, 11.59, 12.23, 12.40, 13.42 and 13.82. The absorption at 3.0$\mu$ represented the characteristic absorption for hydroxyl groups and the broad band at 8.87$\mu$ showed that the hydroxyl group was tertiary. Absorptions at 13.42 and 13.82$\mu$ represent absorptions characteristic of a symmetrically disubstituted ethylenic group which could only be between the 2- and 3-carbon atoms of the p-menthane skeleton.

(2) Conversion of this β-form of 2-p-menthene-1-ol to piperitone was accomplished by the same means as was employed under section "B" for the α-isomer and again dextro-piperitone was formed.

(3) Hydrogenation showed that one double bond was present and that the saturated alcohol, p-menthane-1-ol, was an isomer different from that obtained by hydrogenation of the specific β-terpineol which is obtained by dehydration of terpin-hydrate. Dehydration of the p-menthane-1-ol formed on this hydrogenation yielded carvomenthene.

The data presented in sections "B" and "C" above show that the two tertiary alcohols involved are both 2-p-menthene-1-ols and differ in their structure only in that the methyl and isopropyl groups are in one case cis- and in the other case trans- to each other. Since there is not clear evidence as to which form is cis- or which form is trans-, we have designated and characterized these compounds simply as α- and β-forms of 2-p-menthene-1-ol.

(D) Carvotanacetone was present in the fractions boiling at about 98° C., at 10 mm. Its presence was demonstrated by the comparison of spectra of fractions boiling in this range with the spectrum of pure carvotanacetone.

(E) α-Carvotanacetol was the major component of fractions boiling about 102° C., at 10 mm. On refractionation of fractions rich in this compound, the pure product was obtained and showed boiling point 102° C., at 10 mm., $n_D^{25}$ 1.4793, $[\alpha]_D^{25}$ −5.8°. This compound was identified and characterized as follows:

(1) The infrared spectrum of the material possessed major absorption bands at the following wavelengths ($\mu$): 3.0, 6.9 (broad), 7.20, 7.28, 7.90 (broad), 8.52, 8.60, 9.10, 9.55, 9.69, 10.14, 10.38, 10.67, 11.05 and 12.38. The absorption at 3.0$\mu$ represents an absorption due to the hydroxyl group, and since absorptions at 9.55 and 9.69$\mu$ are within the region characteristic of absorptions due to a secondary hydroxyl group, the product is a secondary alcohol. A trisubstituted ethylene group was indicated by the absorption at 12.38$\mu$.

(2) The identity of this compound was also proven by conversion to carvotanacetone by oxidation with chromic acid. The spectrum of the ketone obtained through this oxidation was identical with the spectrum of pure carvotanacetone.

(F) β-Carvotanacetol was the chief product boiling in the range of 105° C., at 10 mm. The product was purified by refractionation of fractions which were particularly rich, and the pure material was isolated as a product boiling constantly at 105° C., at 10 mm., and showing $n_D^{25}$ 1.4788. This product was identified and characterized as follows:

(1) The major infrared absorption bands present in the spectrum of the best sample were at the following wavelengths ($\mu$): 3.0 (broad), 6.87 (broad), 7.18, 7.27, 7.53 (broad), 7.87 (broad), 8.05, 8.48, 8.58, 8.70, 9.05, 9.38, 9.70 (broad), 10.30, 10.37, 10.55, 10.90, 11.42, 11.83 and 12.32. The absorption at 3.0$\mu$ represented a hydroxyl group and the absorptions at 9.38 and 9.70$\mu$ showed that the hydroxyl group was secondary. The absorption at 12.32$\mu$ represented a trisubstituted ethylene group.

(2) The alcohols oxidized almost quantitatively by the Beckmann procedure to carvotanacetone. The identity of this material was confirmed by comparison of its infrared spectrum with that of a pure known sample.

(G) Products boiling within the range of about 106–127° C., at 10 mm., were not identified other than to determine that products containing carbonyl and hydroxyl groups were present.

(H) A sample of the distillation residue was refluxed with 35% sulfuric acid to yield 25% of steam-volatile distillate which was primarily a mixture of hydrocarbons containing small amounts of alcohols and ketones. This indicated that this residue could have been further fractionated at lower pressures to recover further quantities of volatile materials.

Interpretation of data acquired from the fractional distillations, infrared and ultraviolet spectra provided the following data on yields of the various products described above. The yields are expressed as percent yield based on the total oxygenated products boiling above carvomenthene.

| | Percent |
|---|---|
| Carvomenthene oxide | 16.8 |
| α-2-p-menthene-1-ol | 13.7 |
| β-2-p-menthene-1-ol | 10.0 |
| α-Carvotanacetol | 23.4 |
| Carvotanacetone | 9.0 |
| β-Carvotanacetol | 8.5 |
| Unknown | 3.1 |
| Residue | 15.5 |
| Total | 100.0 |

It will be appreciated that the 2-p-menthene-1-ols produced from carvomenthene can be equilibrated to form piperitols in the same manner as when prepared by partial hydrogenation of 2,8-p-menthene-1-ols, as described in Example I.

Example 3.—Treatment of α-terpineol

α-Terpineol, $α_D^{25}+1°$, $n_D^{25}$ 1.4765, containing 15–20% of dihydro-α-terpineol, was air oxidized by bubbling air through it by means of a fritted glass pencil. At 50–55° C., the mixture reached a peroxide number of 286 in 119 hours. The temperature of the terpineol was then raised to 60–65° C., and the oxidation continued for an additional 191 hours when the final peroxide number was 1405, $n_D^{25}$ 1.4803.

Three grams of the final oxidate liberated enough iodine from potassium iodide to require 1.2 cc. of a saturated sodium sulfite solution. Three liters of this sodium sulfite solution plus twenty grams of sodium hydroxide was used to reduce 5242 g. of the final α-terpineol oxidate. The reduction mixture was heated with efficient stirring from 25° C. to 80° C. in one hour. The reaction was continued at 80–85° C. for 3 hours, at the end of which time the peroxide number was 7.5. The final partly-oxidized sodium sulfite layer was analyzed as containing 119 g./liter of unreacted reducing agent. The aqueous phase was extracted with 200 g. of fresh α-terpineol and the resulting extract was combined with the reduced oxidate.

The total oil layer was fractionated at 10 mm., absolute pressure, to recover the unreacted α-terpineol and dihydro-α-terpineol. The residue, which contained the desired reaction product, was then vacuum stripped at 1–2 mm., absolute pressure, to separate the volatile material from the non-volatile reaction residue. At this point, the material balance was approximately as follows:

| | G. |
|---|---|
| Recovered dihydro-α-terpineol | 960 |
| Recovered α-terpineol | 3212 |
| Volatile reaction products | 967 |
| Non-volatile residue | 61 |
| | 5200 |

A portion of the non-volatile residue was refluxed with 25% sulfuric acid and the oil was steam distilled off as formed. The oil which represented about 40% of the residue weight was analyzed by infrared spectrophotometric methods and found to be largely pinol. This shows that 40% or so of the residue was sobrerol.

The volatile reaction products were then fractionated through an efficient column packed with glass helices. The distillation was carried out at 1–2.5 mm., absolute pressure. Twenty-two fractions were collected ranging in size from 10 to 240 grams. Infrared spectra were made for many of the fractions and these indicated the structure of several of the compounds present. The later fractions contained crystalline material. Spectral and chemical data showed the following compounds to be present in the order of their increasing boiling points:

(A) α-8-hydroxycarvomenthene-monoxide was the major compound boiling at 89° C./2.5 mm. The purest fraction showed $n_D^{25}$ 1.4825. The infrared spectra of the fractions containing this compound had primary absorption bands at the following wavelengths ($μ$): 3.0 (broad), 6.85, 7.28 (broad), 7.67, 7.80, 7.95, 8.10, 8.25, 8.45, 8.80, 9.13, 9.37, 9.78 (broad), 10.20 (broad), 10.55, 10.93, 11.43, 11.70, 11.90, 12.13 and 12.64. The position and shape of the absorption bands revealed the following features as to the structure of the oxide:

$3μ$.—The intensity of this absorption indicated a monohydroxy compound, undoubtedly the 8-hydroxy group of the original α-terpineol.

$11.90, 12.13, 12.64μ$.—These absorptions were in the general region of similar bands in the spectra of other oxides.

A sample of compound "A" was refluxed with an acid clay, but infrared spectral analysis of the product showed much less dehydration and isomerization had taken place than with a similar reaction on compound "B." The reaction was repeated on compound "A" except that a trace of 85% phosphoric acid was added to the clay. In this case, the infrared spectra on the product showed it to contain the same carbonyl compounds, carvenone and one or both of the non-conjugated compounds, dihydrocarvone and 4,8-menthene-2-one, as those produced by the reaction of clay alone on compound "B." Since the reactions of compounds "A" and "B" are the same but their infrared spectra are different, then it must be that compounds "A" and "B" are geometric isomers.

(B) β-8-hydroxycarvomenthene-1,2-monoxide was the principal component of the fractions boiling at 83°/1 mm. The purest fraction showed $n_D^{25}$ 1.4795. The major infrared absorption bands present in the spectrum of this compound were at the following wavelengths ($μ$): 3.0 (broad), 6.95 (broad), 7.34 (broad), 7.73 (broad), 7.90, 8.20, 8.75 (broad), 9.15, 9.38, 9.78, 10.35, 10.87 (broad), 11.75, 12.05, 12.80 and 13.35. The absorption bands were interpreted as follows:

$3μ$.—The intensity of this absorption band indicated a monohydroxy compound.

$8.75μ$.—This broad band represented a tertiary hydroxyl group.

$11.75$ and $12.05μ$.—This pair of absorption bands are of the same general shape, intensity and position as those in other known oxides.

The compound did not absorb hydrogen in the presence of a platinum oxide catalyst at about 60 lbs./sq. in. pressure of hydrogen. Therefore, there are no conjugated or allylic systems in the compound.

When refluxed with the same clay used for treatment in "A" next above, the oxide yielded carvenone and a non-conjugated carbonyl compound(s) assumed to be 4,8-p-menthene-2-one or dihydrocarvone. The presence of carvenone was determined by comparison of the spectra of the isomerization product with the spectrum of a known sample of carvenone. The 2-keto group could only have bene derived from an oxide in the 1,2- or 2,3-position, but since there was no 3-keto compound formed on isomerization, then it must be assumed that the oxide was 1,2.

The clay isomerization product was refluxed for ½ hour with 25% sulfuric acid and then the resulting product was steam distilled from the reaction mixture. The volatile oil then showed a much greater concentration of carvenone by infrared analysis. This substantiates the presence of one or both of the postulated non-conjugated carbonyl compounds in the clay isomerization product of compound "B."

The tertiary hydroxyl group must be in the 8-position corresponding to that in the parent compound, α-terpineol. This must be true since the primary position of oxidative attack is covered by the oxide group.

A combination of the above spectra and chemical data has shown thus that compound "B" is β-8-hydroxycarvomenthene-monoxide.

(C) Trans-2-menthene-1,8-diol was the major component of the fractions boiling at about 98°/1 mm. The purest fraction showed $n_D^{25}$ 1.4970. It was identified by spectral and chemical means as follows:

(1) The major infrared absorption bands in the spectra of the fractions of compound "C" were at the following wavelengths ($\mu$): 3.0 (broad), 7.72 (broad), 8.20, 8.75 (broad), 9.39, 9.75, 9.95, 10.27, 10.50, 10.93, 11.75, 11.93, 12.45, 12.57 and 13.57. The absorption bands were interpreted as follows:

$3\mu$.—This absorption had the intensity of a dihydroxy compound.

$8.75\mu$.—This broad absorption showed that both hydroxyl groups were tertiary since there were no other absorptions representative of a primary or secondary alcohol.

$13.57\mu$.—This absorption was of the shape and intensity of the usual band representing a symmetrically disubstituted ethylene group.

(2) The compound absorbed one molar equivalent of hydrogen at low (50 to 60 lbs./sq. in.) pressures in the presence of platinum oxide and methanol as solvent. The product from this reduction was 1,8-terpin, M.P. 101° C. (uncorrected). The glycol, when crystallized from aqueous acetone, formed terpin hydrate, M.P. 116–117° C. (uncorrected). This is the ordinary form of terpin hydrate as formed by hydration of pinene with acids.

(3) Beckmann oxidation of compound "C" yielded a ketol having an infrared spectra with major absorption bands at the following wavelengths ($\mu$): 3.0 (broad), 6.05 (broad), 6.93 (broad), 7.26 (broad), 7.54, 7.98, 8.20, 8.40, 8.73 (broad), 9.80, 10.75 (broad), 11.38, 12.00, 12.85 and 13.14.

The absorption bands revealed these features of the structure of the ketol, 8-hydroxypiperitone:

$3\mu$.—The density of this hydroxyl absorption was equal to that of a monohydroxy compound.

6.05 and $8.2\mu$.—Conjugated carbonyl absorptions.

$8.73\mu$.—Tertiary alcohol absorption.

Since it has been established that these are tertiary alcohol groups in the 1- and 8-positions and a double bond in the 2-position, the only position possible for a symmetrically disubstituted ethylene group on the p-menthane skeleton, in compound C, then it must be assumed that the conjugated carbonyl group above was formed by allylomerization of the tertiary alcohol group, 1-position, during the oxidation to a secondary alcohol group, 3-position, followed by oxidation. The oxidate had a sweet, minty odor reminiscent of piperitenone.

(4) The ketol, above, was acetylated and the corresponding acetate pyrolyzed at 180° C. for one hour. Infrared spectral analysis of the resulting oil showed it to be primarily 8-acetoxy-piperitone. Pyrolysis of the oil for another 4 hours produced a product which was shown by infrared spectral analysis to be a conjugated carbonyl compound practically free of ester. The oil had a sweet phenolic-type odor which was exactly the same as the product produced by refluxing verbenone with dilute sulfuric acid. Comparison of infrared spectra of the products from pyrolyzed 8-acetoxy piperitone and acid treated verbenone showed them to be essentially the same. The product is thus methyl cyclohexenone:

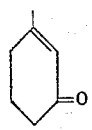

as is reported in Simonsen's "Terpenes," volume II. The formation of the methyl cyclohexenone from the ketol derived from compound "C" establishes the structure of the ketol as being 8-hydroxypiperitone. This, in turn, verifies the allyl shift described in section (C)3.

(D) Cis-2-menthene-1,8-diol was present in the fractions boiling at about 113–122° C./2.5 mm. The product was isolated by extracting the fractions containing it with either benzene or light naphtha. An oil dissolved in the hydrocarbon and compound "D" separated as a solid which melted at 121° C. (uncorrected) when recrystallized from the same type hydrocarbon.

Reduction of the solid in a methanol solution at low (50 to 60 lbs./sq. in.) pressure in the presence of platinum oxide yielded the 1,8-terpin of M.P. 157–158° C. (uncorrected).

Beckmann oxidation of compound "D" yielded 8-hydroxypiperitone, the same as that produced from a similar oxidation of compound "C."

Since compounds "C" and "D" yield the same ketol but 1,8-terpins of opposite geometric configuration, then it must be concluded that compounds "C" and "D" differ only in their configurations at the 1- and 4-carbon atoms.

(E) 8-hydroxy-β-phellandrene was present in the oils isolated from the boiling range 113 to 122° C./2.5 mm. The presence of this compound was shown by comparison of the infrared spectra of the oils with the spectrum of a known sample of 8-hydroxy-β-phellandrene, described and claimed in copending application Serial No. 368,210, filed July 15, 1953, now U.S. Patent No. 2,818,435.

(F) Sobrerol was the major compound present in the fractions boiling at about 125° C./2.5 mm. The compound was isolated in a pure state, needles, M.P. 130° C., uncorrected, by treatment of the semi-solid fractions in the above boiling range with benzene. Identification was made by refluxing the pure solid with oxalic acid solution to convert it quantitatively to pinol. The pinol was identified by its camphoraceous odor and by comparison of its infrared spectrum with the spectrum of a known sample.

(G) 8-hydroxy-carvotanacetone was also present in the fraction boiling at about 125° C./2.5 mm. The presence of this compound was shown by comparison of the spectra of oils isolated from this boiling range with the spectrum of a known sample of 8-hydroxy-carvotanacetone.

(H) A camphoraceous odor, probably due to pinol, was present throughout the fractions containing compounds "D," "E," "F" and "G." The pinol probably arises from the spontaneous dehydration of cis-sobrerol at elevated temperatures. Also, pinol (25 g.), was isolated from the cooling trap in the distillation system.

(I) A portion of the fractionation residue was refluxed with 25% sulfuric acid and the oil liberated was steam distilled off as formed. The oil which represented about 60% of the residue was shown by infrared spectral analysis to be primarily pinol. Therefore, over 60% of the fractionation residue was sobrerol.

A summary of the distillation, spectral and chemical data showed that the following approximate percentages of various materials were present in the reaction product (the percentages are expressed relative to the total reaction product):

| | Percent |
|---|---|
| (A) α-8-hydroxycarvomenthene-1,2-monoxide | 13 |
| (B) β-8-hydroxycarvomenthene-1,2-monoxide | 6 |
| (C) Trans-1,8-dihydroxymenthene-2 | 12 |
| (D) Cis-1,8-dihydroxymenthene-2 | 15 |
| (E) 8-hydroxy-β-phellandrene | trace |
| (F) Trans-sobrerol | 36 |
| (G) 8-hydroxycarvotanacetone | 7 |
| (H) Pinol | 4 |
| (I) Distillation residue | 7 |
| Total | 100 |

The percentages of distillation residue and sobrerol are corrected values based on the sobrerol content of the original residues.

As can be seen from the foregoing illustrative examples, the process of the present invention results in the formation of many valuable and useful oxygenated terpenic products. Many of these find end uses without further processing and/or they are useful as intermediates for the preparation of valuable products.

It will be appreciated, of course, that many variations can be made in the examples without departing from the invention. Sodium sulfite has been used in the examples because of its ready availability, ease of use, cheapness, etc. However, as indicated, other reducing agents for peroxides can be employed. Pyroligneous acid made alkaline is an excellent reducing agent for the oxidation mixture. Ferrous hydroxide reduces the peroxides easily but is difficult to use due to the difficulty in removing the voluminous precipitate of ferric hydroxide from the reduction mass.

Isopiperitenol, its preparation by another method and its conversion to menthol is described and claimed in the copending application of Bain et al., Serial No. 348,825, filed April 14, 1953.

Also, other 1-methyl-$\Delta^1$-cyclohexenes can be employed in the practice of the present invention, substituted or not in the 4-position. Thus, the presence of an isopropyl or modified isopropyl group in the 4-position is not essential to the present invention. There should, of course, be no oxygenated substituents $\alpha$ to the double bond if a tertiary alcohol is the desired product. Due to their ready availability and the utility of the end products, the p-menthane derivatives are generally preferred, and as shown in the examples such compounds readily lend themselves, when treated in accordance with the invention, to the economic production of more desirable oxygenated compounds of that series. It will also be readily appreciated that other oxygen-containing gases than air, such as oxygen itself, can be employed for the autooxidation.

The conversion of the $\Delta^{2-3}$-1-hydroxy compounds produced in accordance with the present invention to 3-oxygenated compounds described herein is claimed in the copending application of Bain, Booth and Gary, Serial No. 382,839, filed September 28, 1953, now U.S. Patent No. 2,894,040.

Having described the invention, what is claimed is:

1. The process for producing 1-hydroxy-$\Delta^2$-unsaturated alcohols which comprises oxidizing a monocyclic 1-methyl-1-cyclohexene compound having two cyclic methylene groups alpha to the $\Delta^1$-double bond, said $\Delta^1$-double bond being a trisubstituted double bond with gaseous oxygen under substantially anhydrous conditions to produce a mixture of oxidation products containing hydroperoxides and epoxides and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing a 1-hydroxy-$\Delta^2$-derivative of the starting material and the epoxides present in the oxidation mixture prior to reduction.

2. The process of claim 1 in which the starting material is a derivative of p-menthane.

3. The process for producing 1-hydroxy-$\Delta^2$-unsaturated alcohols which comprises oxidizing a $\Delta^1$-p-menthane compound selected from the class consisting of 1,8-p-menthadiene, carvomenthene and $\alpha$-terpineol with gaseous oxygen under substantially anhydrous conditions to produce a mixture of oxidation products containing hydroperoxides and epoxides and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing a 1-hydroxy-$\Delta^2$-derivative of the starting material and the epoxides present in the oxidation mixture prior to reduction.

4. The process for producing 1-hydroxy-$\Delta^2$-unsaturated alcohols which comprises oxidizing a $\Delta^1$-p-menthane compound selected from the class consisting of 1,8-p-menthadiene, carvomenthene and $\alpha$-terpineol with gaseous oxygen under substantially anhydrous conditions to produce a mixture of oxidation products containing hydroperoxides and epoxides and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing a 1-hydroxy-$\Delta^2$-derivative of the starting material and the epoxides present in the oxidation mixture prior to reduction, and fractionally distilling the reduction mixture to recover oxygenated products therefrom.

5. The process for producing 1-hydroxy-$\Delta^2$-unsaturated alcohols which comprises oxidizing a $\Delta^1$-p-menthane compound selected from the class consisting of 1,8-p-menthadiene, carvomenthane and $\alpha$-terpineol with gaseous oxygen under substantially anhydrous conditions to produce a mixture of oxidation products containing hydroperoxides and epoxides and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing a 1-hydroxy-$\Delta^2$-derivative of the starting material and the epoxides present in the oxidation mixture prior to reduction, and recovering the 1-hydroxy-$\Delta^2$-unsaturated alcohol by fractional distillation of the reduction mixture.

6. The process for producing 2,8-p-menthadiene-1-ol and monoepoxides of 1,8-p-menthadiene which comprises oxidizing 1,8-p-menthadiene with gaseous oxygen under substantially anhydrous conditions to produce a mixture of oxidation products containing hydroperoxides and mono-epoxides of 1,8-p-menthadiene and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is formed a mixture containing 2,8-p-menthadiene-1-ol and the mono-epoxides of 1,8-p-menthadiene.

7. The process for producing 2,8-p-menthadiene-1-ol and mono-epoxides of 1,8-p-menthadiene which comprises oxidizing 1,8-p-menthadiene with gaseous oxygen under substantially anhydrous conditions to produce a mixture of oxidation products containing hydroperoxides and mono-epoxides of 1,8-p-menthadiene and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is formed a mixture containing 2,8-p-menthadiene-1-ol and the mono-epoxides of 1,8-p-menthadiene, and fractionally distilling the reduction mixture to recover oxygenated products therefrom.

8. The process of claim 7 in which a fraction rich in 2,8-p-menthadiene-1-ol is recovered.

9. The process of claim 7 in which a fraction rich in 8,9-epoxy-limonene is recovered.

10. The process of claim 7 in which fractions of successively increased boiling point enriched in 1,2-epoxy-limonene, 8,9-epoxy-limonene, 2,8-p-menthadiene-1-ol, carvone and carveol, respectively, are recovered.

11. The process for producing 2-p-menthene-1-ol and carvomenthene oxide which comprises oxidizing carvomenthene with gaseous oxygen under substantially anhydrous conditions to produce a mixture of oxidation products containing hydroperoxides and carvomenthene oxide and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing 2-p-menthene-1-ol and carvomenthene oxide.

12. The process for producing 2-p-menthene-1-ol and carvomenthene oxide which comprises oxidizing carvomenthene with gaseous oxygen under substantially anhydrous conditions to produce a mixture of oxidation products containing hydroperoxides and carvomenthene oxide and decomposing the hydroperoxides in said mixture by treating the mixture of oxidation products with a reducing agent for peroxides capable of absorbing oxygen from the air under aqueous alkaline conditions, the amount of alkaline material being sufficient to maintain the alkaline condition throughout the reduction treatment, whereby there is produced a mixture containing 2-p-menthene-1-ol and carvomenthene oxide, and fractionally distilling the reduction mixture to recover oxygenated products.

13. The process of claim 12 in which a fraction rich in 2-p-menthene-1-ol is recovered.

14. The process of claim 12 in which a fraction rich in carvomenthene-oxide is recovered.

15. The process of claim 12 in which fractions of successively increased boiling point enriched in carvomenthene-oxide, 2-p-menthene-1-ol, α-carvotanacetol, carvotanacetone and β-carvotanacetol, respectively, are recovered.

16. The process for producing 2-p-menthene-1,8-diol and 8-hydroxy-carvomenthene-1,2-monoxide which comprises oxidizing α-terpineol with gaseous oxygen under substantially anhydrous conditions to produce a mixture of oxidation products containing hydroperoxides and 8-hydroxy-carvomenthene-1,2-monoxide, and decomposing the hydroperoxides in said mixture by treating the mixture of oxidation products with a reducing agent for peroxides capable of absorbing oxygen from the air under aqueous alkaline conditions, the amount of alkali being sufficient to maintain the alkalinity throughout the treatment, whereby there is produced a mixture containing 2-p-menthene-1,8-diol and 8-hydroxy-carvomenthene-1,2-monoxide.

17. The process for producing 2-p-menthene-1,8-diol and 8-hydroxy-carvomenthene-1,2-monoxide which comprises oxidizing α-terpineol with gaseous oxygen under substantially anhydrous conditions to produce a mixture of oxidation products containing hydroperoxides and 8-hydroxy-carvomenthene-1,2-monoxide, and decomposing the hydroperoxides in said mixture by treating the mixture of oxidation products with a reducing agent for peroxides capable of absorbing oxygen from the air sufficient to maintain the alkalinity throughout the treatment, whereby there is produced a mixture containing 2-p-menthene-1,8-diol and 8-hydroxy-carvomenthene-1,2-monoxide, and fractionally distilling the reduction mixture to recover oxygenated products.

18. The process of claim 17 in which a fraction rich in 2-menthene-1,8-diol is recovered.

19. The process of claim 17 in which a fraction rich in 8-hydroxy-carvomenthene-1,2-monoxide is recovered.

20. The process of claim 17 in which fractions of successively increased boiling point enriched in 8-hydroxy-carvomenthene-1,2-monoxide, 2-p-menthene-1,8-diol, 8-hydroxy-phellandrene, sobrerol and 8-hydroxy-carvotanacetone, respectively, are recovered.

21. The process of claim 1 in which the oxidation is carried to a peroxide value of between 1000 and 2000.

22. A 2-p-menthene-1,8-diol.

23. An 8-hydroxy-carvomenthene-1,2-monoxide.

24. The mixture resulting from the process of claim 1.

25. The mixture resulting from removal of hydrocarbons from the mixture resulting from the process of claim 1.

26. The mixture of volatile oxygenated products produced by the process of claim 1.

27. A mixture comprising essentially limonene-1,2-oxide, limonene-8,9-oxide, cis- and trans-forms of 2,8-p-menthadiene-1-ol, carvone and carveol.

28. A mixture comprising essentially carvomenthene oxide, the cis- and trans-forms of 2-p-menthene-1-ol, carvotanacetol and carvotanacetone.

29. A mixture comprising essentially the cis- and trans-forms of 8-hydroxy-carvomenthene-1,2-oxide, the cis- and trans-forms of 1,8-dihydroxy-menthene-2, trans-sobrerol and 8-hydroxy-carvotanacetone.

References Cited in the file of this patent

Bodendorf: Chem. Abstracts, vol. 27 (1933), page 4472 (1 pg.).
Hock et al.: Chem. Abstracts, vol. 37 (1943), pgs. 3748–9 (2 pgs.).
Simonsen et al.: The Terpenes, vol. I, 2nd Ed. (1947), pgs. 154, 155 (2 pgs.), publ. by Cambridge University Press (London).
Farmer et al.: J. Chem. Soc. (London), pgs. 121–39 (1942).
Farmer et al.: Ibid., pgs. 10 to 13 (1946).
Blumann and Zeitschel: Berichte d.d.c.Ges., vol 47, pgs. 2623–8 (1914).
Schimmel & Co. Report (1932), pgs. 80–81.
Borgwardt et al.: J.A.C.S., vol. 56 (1934), p. 1165–7.
Zeitschel et al.: J. Prakt. Chem., vol. 133, p. 370–3 (1932).